US006455021B1

(12) United States Patent
Saito

(10) Patent No.: US 6,455,021 B1
(45) Date of Patent: Sep. 24, 2002

(54) METHOD FOR PRODUCING CARBON NANOTUBES

(75) Inventor: Yahachi Saito, Tsu (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 09/357,569

(22) Filed: Jul. 20, 1999

Related U.S. Application Data

(60) Provisional application No. 60/136,024, filed on May 25, 1999.

(30) Foreign Application Priority Data

Jul. 21, 1998 (JP) ............................................. 10-221016

(51) Int. Cl.$^7$ ................................................. D01F 9/12
(52) U.S. Cl. ..................................... 423/447.3; 204/173
(58) Field of Search ........................ 423/447.3, 445 B; 204/156, 164, 173

(56) References Cited

U.S. PATENT DOCUMENTS 5,424,054 A * 6/1995 Bethune et al. .......... 423/447.2
5,500,200 A * 3/1996 Mandeville et al. ..... 423/447.3

FOREIGN PATENT DOCUMENTS

| JP | 6-157016 | * | 6/1994 | ........... C01B/31/02 |
| JP | 7-197325 | * | 8/1995 | ........... D01F/9/127 |
| JP | 9-188509 | * | 7/1997 | ........... C01B/31/02 |

OTHER PUBLICATIONS

S. Seraphin et al., 'Catalytic Role of nickel, palladium and platinum in the formation of carbon nanoclusters' in Chemical Physics Letters vol. 217, No. 3 pp. 191–198.*

J. Appl. Phys., vol. 80, No. 5, Sept. 1, 1996, pp. 3062–3067, "Carbon Nanocapsules and Single–Layered Nanotubes Produced with Platinum–Group Metals (Ru, Rh, Pd, Os, Ir, Pt) by Arc Discharge", Saito, Y. et al.*

J. Phys. Chem. Solid, vol. 57, No. 2, 1996, pp. 243–246, "Radial Single–Wall Carbon Tubes Growing on Surfaces of Pd Particles", Saito, Y. et al.*

Z. Phys. D, vol. 40, 1997, pp. 421–424, "Growth of Single–Layer Carbon Tubes Assisted with Iron–Group Metal Catalysts in Carbon Arc", Saito, Y. et al.*

* cited by examiner

Primary Examiner—Stuart L. Hendrickson
(74) Attorney, Agent, or Firm—Sughrue Mion, PLLC

(57) ABSTRACT

The method of the present invention deposits carbon nanotubes by contacting carbon vapor with a non-magnetic transition metal including at least two elements selected from the group consisting of ruthenium, rhodium, palladium, and platinum. For example, carbon vapor and particulates of the non-magnetic transition metal are generated by arc discharge between a rod-shaped anode containing carbon and the non-magnetic transition metal, and a rod-shaped cathode opposing to the anode, and carbon nanotubes are deposited on a base portion of the cathode. The arc discharge is performed in a reactor chamber containing inert gas or the mixture of inert gas and hydrogen gas, at a pressure ranging from 50 to 1500 Torr.

21 Claims, 5 Drawing Sheets

METHOD FOR PRODUCING CARBON NANOTUBES

CROSS REFERENCE TO RELATED APPLICATIONS

The present application claims priorities based o n Japanese Unexamined Patent Application No. Hei 10-221016 filed on Jul. 21, 1999 and U.S. Provisional Application No. 60/136,024, filed May 25, 1999 and the contents of which are incorporated herein by reference.

BACKGROUND OF THE INVENTION

1. Field of the Invention

The present invention relates to a method for producing carbon nanotubes, in particular, it relates to a technique for producing single-walled carbon nanotubes.

2. Description of Related Art

Recently, carbon nanotubes have given rise to expectations not only as materials having a superior mechanical strength, but also as materials having field emission functions, hydrogen absorption functions, and magnetic properties. Carbon nanotubes of this kind are also called "graphite whiskers" as referred to in Japanese Unexamined Patent Application, First Publication, No. Hei 5-146592; "filament carbons" or "graphite fibers" as referred to in Japanese Unexamined Patent Application, First Publication, No. Sho 61-136992; "extra fine carbon tubes" as referred to in Japanese Unexamined Patent Application, First Publication, No. Hei 6-345413; "carbon tubes" as referred to in Japanese Unexamined Patent Application, First Publication, No. Hei 8-121207; "carbon fibrils" as referred to in Japanese Unexamined Patent Application, First Publication, No. 2-503334; and "carbon micro tubes" or "carbon nanofibers" as referred to in the journal "CARBON" (Vol. 174, page 215, 1996).

Although various methods for producing carbon nanotubes have been proposed, as explained in Japanese Unexamined Patent Application, First Publication, No. Hei 06-280116, most of these methods produce only multiwalled carbon nanotubes. A multiwalled carbon nanotube is a carbon fiber consisting of a plurality of graphen sheets.

However, in order to effectively utilize the above-described field emission functions, hydrogen absorption functions, or magnetic functions, it is important to simplify the structure of the carbon nanotubes. Therefore, it is necessary to produce, by an industrial method, a large amount of single-walled carbon nanotubes respectively consisting of single-layered graphen sheets.

Single-walled carbon nanotubes are also called "fullerene pipes" as referred to in *Science*, 1998, vol. 280, page 1254, or "carbon single tubes" as referred to in Japanese Unexamined Patent Application, First Publication, No. Hei 8-91816.

In the conventional method, carbon nanotubes are produced, for example, by vapor deposition in which an arc discharge is generated using carbon electrodes and the carbon vapor is deposited on the surface of one electrode. In this method, it is also known that single-walled carbon nanotubes can be selectively produced by using metal catalysts and by controlling the pressure, the composition of the atmospheric gas, and the composition of the raw materials.

For example, Japanese Unexamined Patent Application, First Publication, No. Hei 7-197325 and Japanese Unexamined Patent Application, First Publication, No. Hei 9-188509 respectively disclose methods for producing single-walled carbon nanotubes using, as a metal catalyst, iron, cobalt, or nickel. Also, in *Science*, 1996, vol. 273, page 483, vapor deposition of single-walled carbon nanotubes by laser abrasion using metal catalysts such as cobalt and nickel is reported.

However, in the above methods, single-walled carbon nanotubes having straight shapes cannot be produced, instead, only those having helical shapes are produced. Therefore, these methods have the drawback that the application of the produced single-walled carbon nanotubes is narrowly limited to a particular field of the art. Furthermore, although it is expected that single-walled carbon nanotubes will provide superior properties when the diameter distribution thereof is narrow, because the diameter distribution of the single-walled carbon nanotubes produced by the prior methods is broad, there are the drawbacks that the function of the single-walled carbon nanotubes is not consistent.

SUMMARY OF THE INVENTION

It is an object of the present invention to produce single-walled carbon nanotubes having a straight shape at a high production efficiency. Also, it is another object of the present invention to produce single-walled carbon nanotubes having both small diameters and a narrow diameter distribution.

In order to accomplish the above objects, the method of the present invention comprises the step of developing carbon nanotubes by contacting carbon vapor with a non-magnetic transition metal including at least two elements selected from the group consisting of ruthenium, rhodium, palladium, and platinum.

The carbon vapor and particulates of a non-magnetic transition metal may be generated by arc discharge. The arc discharge may be performed in a reactor chamber containing an inert gas or the mixture of an inert gas and hydrogen gas, at a pressure ranging from 50 to 1500 Torr.

The arc discharge may be performed between a tip of a rod-shaped anode which contains carbon and the non-magnetic transition metal, and a tip of a rod-shaped cathode arranged so as to direct the tip toward the tip of the anode. The carbon vapor and the particulates of a non-magnetic transition metal will thereby be generated, and carbon nanotubes will be deposited on the circumferential surface of the base portion of the cathode.

The non-magnetic transition metal is preferably one selected from the group consisting of a binary mixture of ruthenium and rhodium, a binary mixture of ruthenium and palladium, a binary mixture of ruthenium and platinum, a binary mixture of rhodium and palladium, a binary mixture of rhodium and platinum, and a binary mixture of palladium and platinum.

The electrode used for generating arc discharge in order to produce carbon nanotubes contains at least two elements selected from the group consisting of ruthenium, rhodium, palladium, and platinum, and in particular, it is preferably the above mentioned binary mixture. The weight ratio of the non-magnetic transition metal to the graphite powder (metal:C) may be in the range of 2:1–10:1.

The composite which can be obtained by the method of the present invention includes particulates of non-magnetic transition metal and single-walled carbon nanotubes straightly extending from the surfaces of the particulates. The average grain size of the particulates of the non-magnetic transtion metal may be 10–20 nm, and the length of the single-walled carbon nanotubes extending from the surfaces of the particulates may be 1–1.28 nm.

According to the present invention, by using non-magnetic transition metal as a catalyst for vapor deposition, it is possible to produce, at a high yield, single-walled carbon nanotubes which have straightly extending shapes, not spirally wound shapes. Also, the single-walled carbon nanotubes obtained by the present method have small diameters, a narrow diameter distribution, and superior properties. Furthermore, the control of the average diameter and the diameter distribution of single-walled carbon nanotubes can be easily performed by controlling the pressure in the reactor chamber.

Additionally, because the non-magnetic transition metal does not have ferromagnetism, the magnetic property of the single-walled carbon nanotubes are not inhibited by the catalyst, and the characteristics of the products are not affected. Therefore, the products of the method of the present invention can be widely used for various kind of applications.

DETAILED DESCRIPTION OF THE INVENTION

Figure 1:
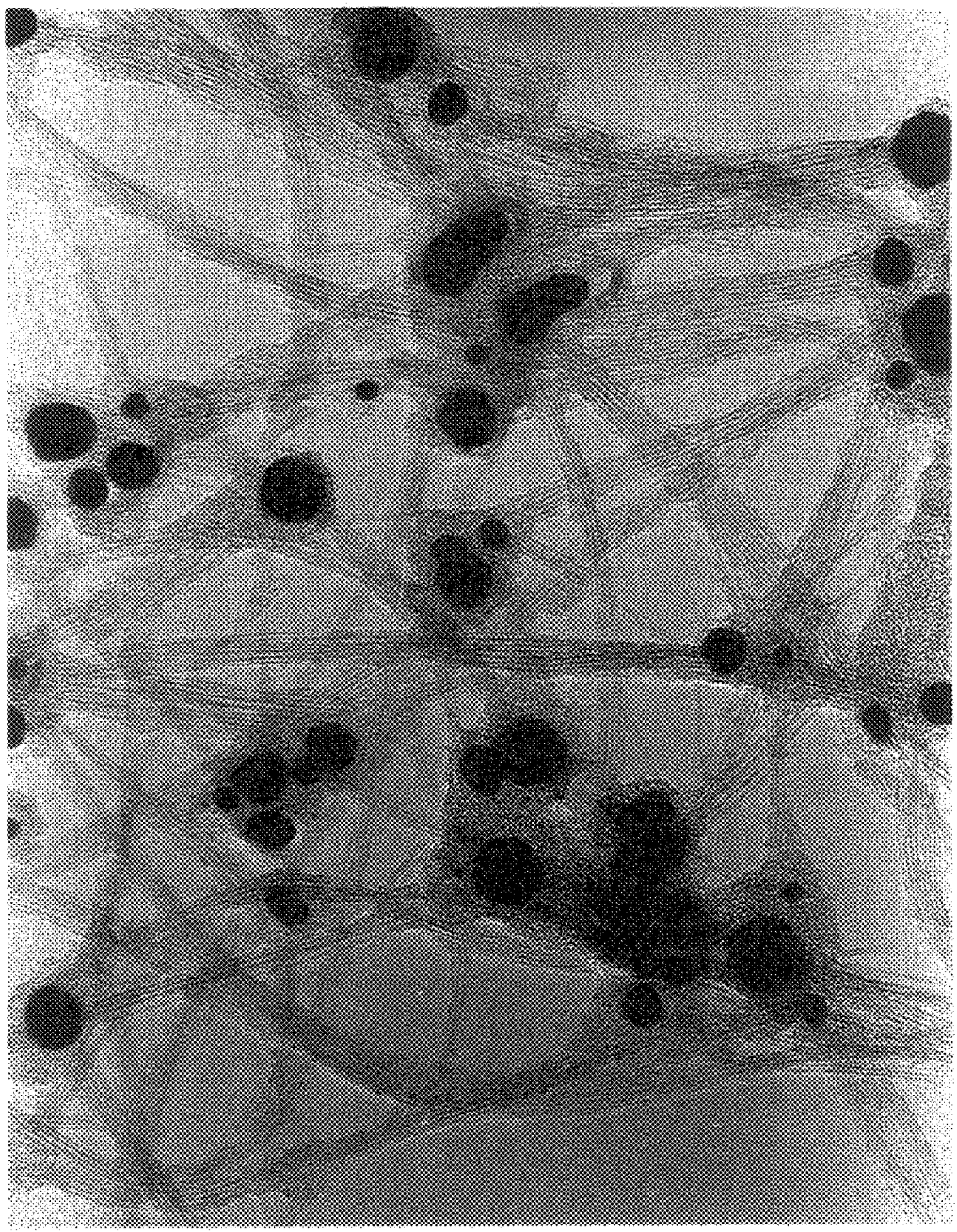
FIG. 1 is a TEM (transmission electron microscope) picture of single-walled carbon nanotubes produced in Example 1 at a pressure of 600 Torr.

Hereinafter, the embodiments of the method for producing carbon nanotubes according to the present invention will be explained in detail.

The electrode (anode) for the production of carbon nanotubes used in the present invention contains carbon and a non-magnetic transition metal which acts as a catalyst, and such an electrode can be prepared, for example, by embedding the non-magnetic transition metal in a graphite rod. Specifically, for example, a hole having a suitable diameter is formed on the surface of the graphite rod, and the hole is filled with the non-magnetic transition metal in a state such as powder. The average grain size of the non-magnetic transition metal is not particularly limited in the present invention.

Instead of embedding non-magnetic transition metal in a state such as powder in the center of the graphite rod, it is also possible to form an electrode by compacting a mixture of graphite (carbon) powder and the non-magnetic transition metal powder. In this case, because the step for embedding the transition metal in the graphite rod can be omitted, the production efficiency of the electrode can be improved. Although the mixing ratio of the non-magnetic transition metal to the graphite powder is not particularly limited in the present invention, the weight ratio of the non-magnetic transition metal to the graphite powder is preferably in the range of 2:1–10:1.

The non-magnetic transition metal used in the present invention includes at least two elements selected from the group consisting of ruthenium (Ru), rhodium (Rh), palladium (Pd), and platinum (Pt).

Preferably, the non-magnetic transition metal is one selected from the group consisting of a binary mixture of ruthenium and rhodium, a binary mixture of ruthenium and palladium, a binary mixture of ruthenium and platinum, a binary mixture of rhodium and palladium, a binary mixture of rhodium and platinum, and a binary mixture of palladium and platinum. In this case, the yield of single-walled carbon nanotubes can be improved. The mixing ratio of the two elements in each binary mixture may be adjusted according to the requirements. However, the percentage content of the lesser element in the binary mixture is preferably not less than 1%, and more preferably, it is not less than 10%. In this case, the effect provided by the binary mixture can be improved.

On the other hand, the carbon electrode which used as a cathode is preferably a high purity graphite rod, and the anode and the cathode are arranged in a reactor chamber.

The inner space of the reactor chamber is preferably filled with an inert gas, such as helium and argon, of which the pressure is preferably adjusted to 50–1500 Torr. Hydrogen gas may be added to the inert gas, and in this case, the mixing ratio of hydrogen gas is preferably in the range between 10–50 volume %. By adding hydrogen gas, the growth rate of nanotubes can be improved.

Next, an arc discharge, which is preferably a direct current arc, is generated between the cathode and the anode in order to elevate the temperature. By the heat of the arc discharge, the tip of the anode evaporates, and carbon vapor and atomized particulates of non-magnetic transition metal are generated. Because the anode will be gradually shortened during the reaction (arc discharge), in order to stabilize the arc discharge, it is preferable to control the distance between the anode and the cathode to be in the range of, for example, about 1–2 millimeters.

The condition of the non-magnetic transition metal, which is atomized in the atmospheric gas by the evaporation of the anode and the arc discharge, has not been determined with certainty. However, it is believed to be vapor or very small particles of molten metal. In this specification, all of them are called "particulates".

A part of the carbon vapor and the particulates of the non-magnetic transition metal reach the surface of the cathode, and concentrate and accumulate on the surface of the cathode.

In the conventional arc discharge, most of the deposits adhere to the tip of the cathode. However, in the present invention, most of single-walled carbon nanotubes adhere to the circumferential surface of the base portion of the cathode. Therefore, a deposit containing high concentration of single-walled carbon nanotubes can be produced on the surface of the base portion of the cathode, and it is possible to obtain single-walled carbon nanotubes at high yield.

The mechanism of the precipitation and growth of the carbon nanotubes has not been determined with certainty but is under examination, and the inventors believe it to be as follows, at the present time.

Because most of the single-walled carbon nanotubes are deposited on the surface of the base portion of the cathode, the carbon vapor and particulates of the non-magnetic transition metal generated by the anode are considered to be present in the atmospheric gas for a relatively long time. Next, in the atmospheric gas, the carbon vapor and the particulates of the non-magnetic transition metal react and form particulates containing an alloy of carbon and the non-magnetic transition metal (it is well-known that carbon and metal form alloys).

Although it has not been verified, the temperature in an arc discharge area is presumed to be 500–1200° C. (the temperature in the center of the area is presumed to be 800–900° C.). The temperature at the tip of the cathode is highest, the temperature at the base portion of the cathode is lower, and the vicinity of the base portion has a temperature gradient in which the temperature gradually ascends with distance from the surface of the base portion.

Carbon vapor and the particulates of the non-magnetic transition metal reach the surface of the base portion around which the above temperature gradient is formed. When they are quickly cooled on the surface of the base portion, supersaturated carbon vapor precipitates so as to develop straight tubular carbon from the surface of the base portion along the direction of the temperature gradient while being affected by the non-magnetic transition metal.

The diameter and the diameter distribution of the single-walled carbon nanotubes can be controlled by adjusting the pressure in the reactor chamber during the reaction (arc discharge). When the pressure is low, although the average diameter of the produced nanotubes will diminish, the distribution thereof will be slightly enlarged. For example, in such a case, nanotubes having an average diameter of about 1.0 nm and a diameter distribution of about 0.3 nm can be obtained. In contrast, when the pressure is high, although the average diameter of the produced nanotubes will slightly increase, the distribution thereof will greatly diminish. For example, in such a case, nanotubes having an average diameter of about 1.28 nm and a diameter distribution of about 0.07 nm can be obtained. However, because the yield of single-walled carbon nanotubes has the tendency to diminish when the pressure is too high or too low, the pressure is preferably in the range of 500–1000 Torr, and is more preferably about 600 Torr.

The properties of the deposit including the single-walled carbon nanotubes obtained by the present method can be evaluated using a scanning electron microscope (SEM), a transmission electron microscope (TEM), a Raman Scattering spectrum analyzer, or an X-ray diffraction apparatus, according to methods described in the following documents: Chem. Phys. Lett. 220, 186(1994); J. Phys. Soc. Jpn. Vol. 63 (1994), p.2252; Science, Vol. 275 (1997) p.187.

FIG. 1 shows an example of a TEM microphotograph of single-walled carbon nanotubes produced by the present invention. In this microphotograph, the black portions are the particulates of non-magnetic transition metal, and the large numbers of strings extending from the particulates are single-walled carbon nanotubes. The whole of them are called "composite including carbon nanotubes" in the present specification.

The single-walled carbon nanotubes produced by the method of the present invention generally have a straight tubular shape having a length of about 10 μm and a diameter of 1.0–1.28 nm. Furthermore, the weight ratio of single-walled carbon nanotubes to all the carbon in the deposit adhered to the base portion of the cathode will reach to 20–30 weight % when the reaction conditions are suitable, and it will reach to 50 weight % when the reaction conditions are best. The balance of the carbon, other than the single-walled carbon nanotubes, is amorphous carbon.

The particulates of the non-magnetic transition metal contained in the deposit together with the single-walled carbon nanotubes have an average grain size of 10–20 nm. Because the non-magnetic transition metal has no ferromagnetism, the particles thereof does not inhibit the magnetic properties of the single-walled carbon nanotubes.

The means for generating carbon vapor and particulates of non-magnetic transition metal is not limited to arc discharge, but it may be any other means which can generate carbon vapor and particulates of non-magnetic transition metal. For example, laser abrasion of the mixture of carbon and non-magnetic transition metal, or a method for generating vapor by externally heating a mixture gas of an organic compound of non-magnetic transition metal and a carrier gas, may be applied to the present invention.

As described above, in the method of the present invention, by using non-magnetic transition metal as a catalyst, it is possible to produce, at a high yield, single-walled carbon nanotubes which have straightly extending shapes, not spirally wound shapes. Also, the single-walled carbon nanotubes obtained by the present method have small diameters, a narrow diameter distribution, and superior properties. Furthermore, the control of the average diameter and the diameter distribution of single-walled carbon nanotubes can be performed by controlling the pressure in the reactor chamber.

Additionally, because the non-magnetic transition metal does not have ferromagnetism, the magnetic properties of the single-walled carbon nanotubes are not inhibited by the presence of the catalyst, and the characteristics of the products are not affected. Therefore, the products of the method of the present invention can be widely used, as a composition including single-walled carbon nanotubes or purified single-walled carbon nanotubes, for various kind of applications.

EXAMPLES

Hereinafter, the examples of the present invention will be explained.

Example 1

In a graphite rod having a diameter of 6 mm and a length of 50 mm, a cylindrical hole, having an inner diameter of 3.2 mm and a depth of 30 mm, was formed from one end of the rod along the center axis of the rod, and a mixture of graphite powder and non-magnetic transition metal powder was stuffed in the hole to provide an electrode (anode) for producing carbon nanotubes. As the non-magnetic transition metal, a binary mixture of rhodium and platinum was used, and the weight ratio of rhodium (Rh):platinum (Pt):carbon (C) in the stuffed mixture was 5:5:2. The weight ratio of the non-magnetic transition metal in the total weight of the electrode was 50%.

On the other hand, as a cathode for producing carbon nanotubes, a graphite rod having a diameter of 13 mm and a length of 30 mm was prepared. The purity of the graphite rod was 99.998 weight %.

Figure 6:
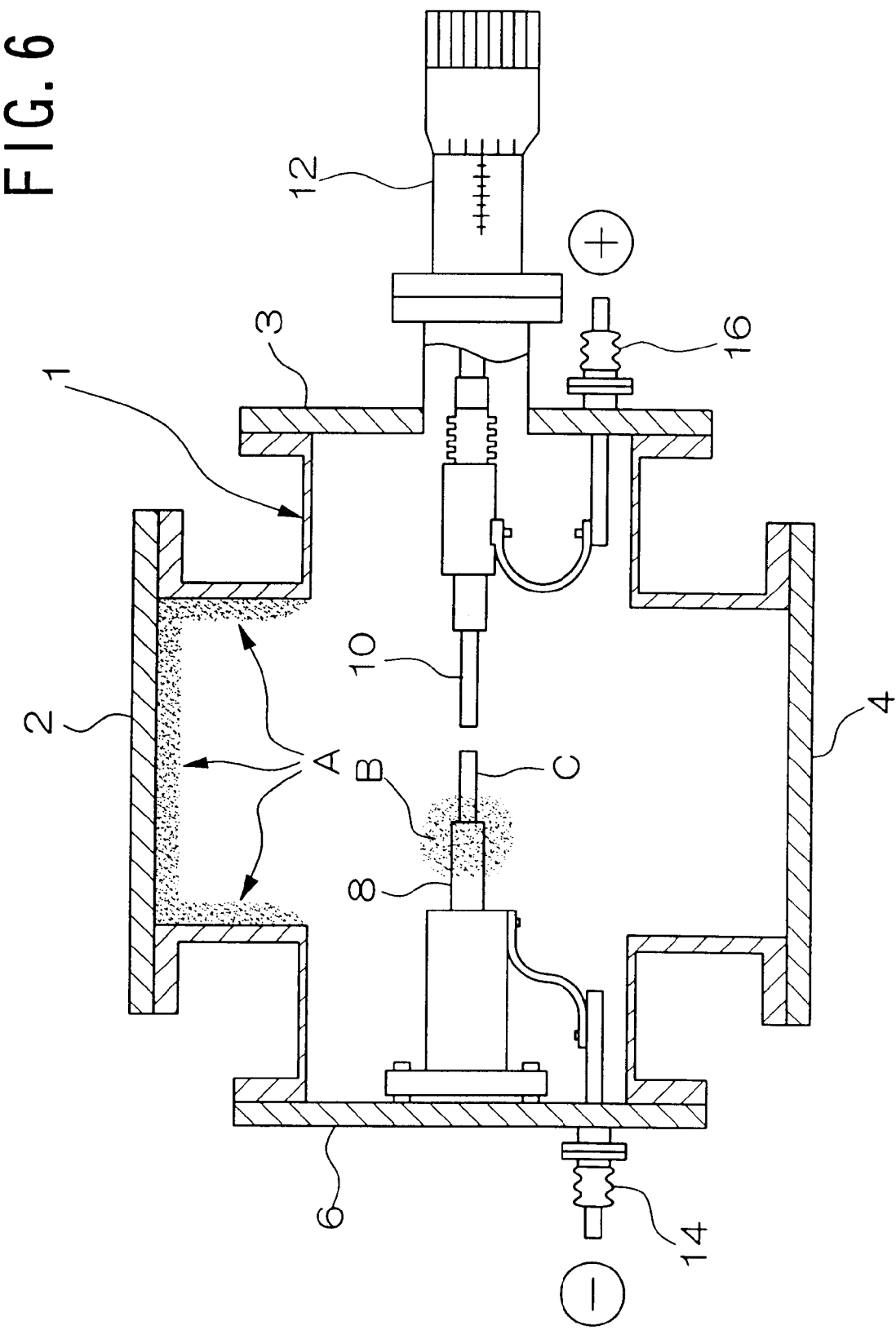
FIG. 6 is a side cross section of an apparatus for producing carbon nanotubes used in Example 1.

These electrodes were fitted in the apparatus shown in FIG. 6. This apparatus comprises a reactor chamber (vacuum chamber) 1, to which an upper flange 2, a lower flange 4, a front flange 3, and a rear flange are fixed. Inside the reactor chamber 1, the above-described cathode 8 and anode 10 for producing carbon nanotubes are fixed so that the tips thereof face each other, and a feeding device 12 is provided for maintaining at a constant value the distance between the tips of the anode and the cathode 8. The tip of the anode means the tip of an anode deposit C when it has grown up from the tip of the anode 10. The cathode 8 and the anode 10 are respectively connected to cathode and anode terminals 14 and 16, and these terminals 14 and 16 are connected to a direct voltage source (not shown).

Next, the atmospheric gas in the reactor chamber 1 was substituted by helium gas of purity 99.9%, and direct voltage arc discharge was performed. The combinations of the pressure in the reactor chamber 1 and the current applied were 600 Torr and 70 A, or 50 Torr and 100 A. The distance between the tips of the anode 10 and the cathode 8 was controlled so as to be 1–2 mm during the reaction. After 1–2 minutes from the beginning of the reaction, deposits containing carbon as a main composition were generated.

Soot (chamber soot) A adhered to the inner surface of the reactor chamber 1, a cylindrical deposit C grew up from the tip of cathode 8, and rubber-like soot (cathode soot) adhered to the circumferential surface of the cathode 8. These substances were collected, and the properties of them were evaluated by TEM, Raman scattering spectrum, and X ray diffraction.

The TEM microphotographs were photographed by a "CM120" sold by Phillips Inc. at 120 kV. The collected soot or deposit were brayed with a mortar, and the powders were dispersed in ethyl alcohol under ultrasonic vibration. The resulting suspensions were dropped on porous carbon grids, and, after drying, samples were obtained.

The Raman scattering spectrums were measured using an argon ion laser (488 nm), at room temperature, in the manner of back scattering geometry. As the X-ray diffraction analysis, powder X-ray diffraction analysis was performed using a Cu—K α source.

From the results of these experiments, it was found that the majority of the single-walled carbon nanotubes were contained in the cathode soot. Furthermore, from the TEM photographs and the result of the Raman scattering analysis, it was ascertained that more than 50 weight % of the cathode soot consisted of single-walled carbon nanotubes.

In contrast, single-walled carbon nanotubes were not found in the cylindrical deposit C, also, in the chamber soot A, only a trace amount of single-walled carbon nanotubes was detected.

FIG. 1 is a TEM microphotograph of the cathode soot produced under a pressure of 600 Torr. This cathode soot was found to be a composite consisting of particulates of non-magnetic transition metal and straight single-walled carbon nanotubes extending from the surface of the metal particulates. The single-walled carbon nanotubes may be utilized after isolation from the composite, or, the composition itself may be utilized.

Figure 2:
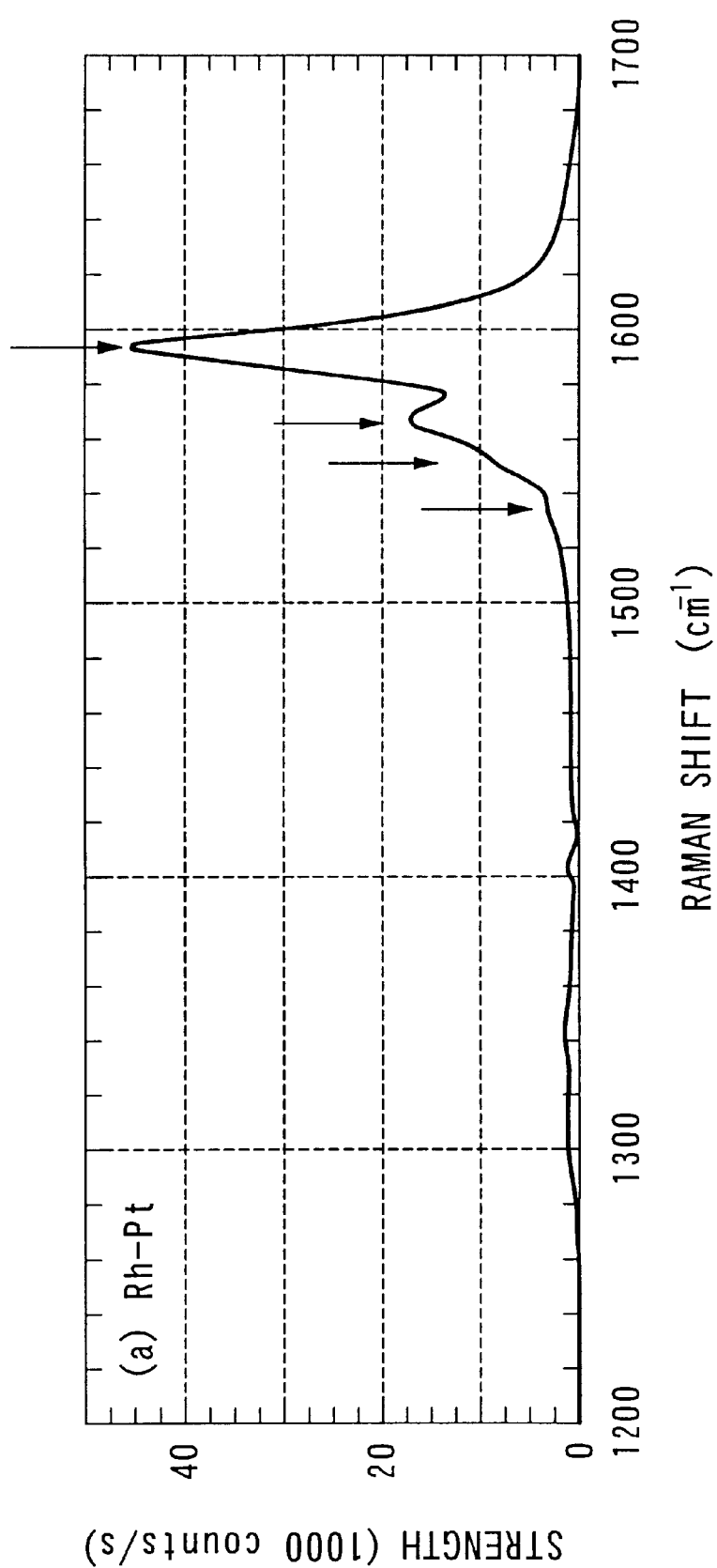
FIG. 2 is a graph indicating the Raman scattering spectrum of cathode soot produced in Example 1 at a pressure of 600 Torr.

FIG. 2 illustrates the Raman scattering spectrum of cathode soot produced under a pressure of 600 Torr. In this spectrum, the main peak of 1580 cm$^{-1}$ corresponds to single-walled carbon nanotubes, and the small peak of 1340 cm$^{-1}$ corresponds to amorphous carbon.

In comparison with the case where the inner pressure of the reactor chamber was 600 Torr and the case where the inner pressure of the reactor chamber was 50 Torr, there were not substantial differences between the TEM microphotographs and between the ratios of single-walled carbon nanotubes and amorphous carbon.

Figure 3:
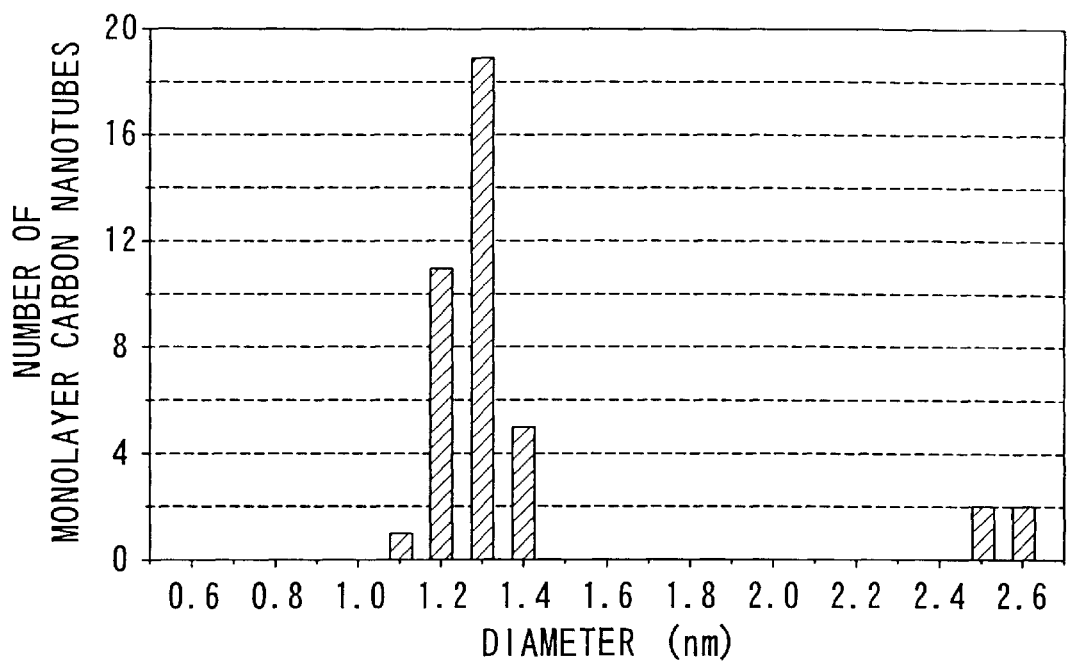
FIG. 3 is a graph indicating the diameter distribution of single-walled carbon nanotubes produced in Example 1 at a pressure of 600 Torr.
Figure 4:
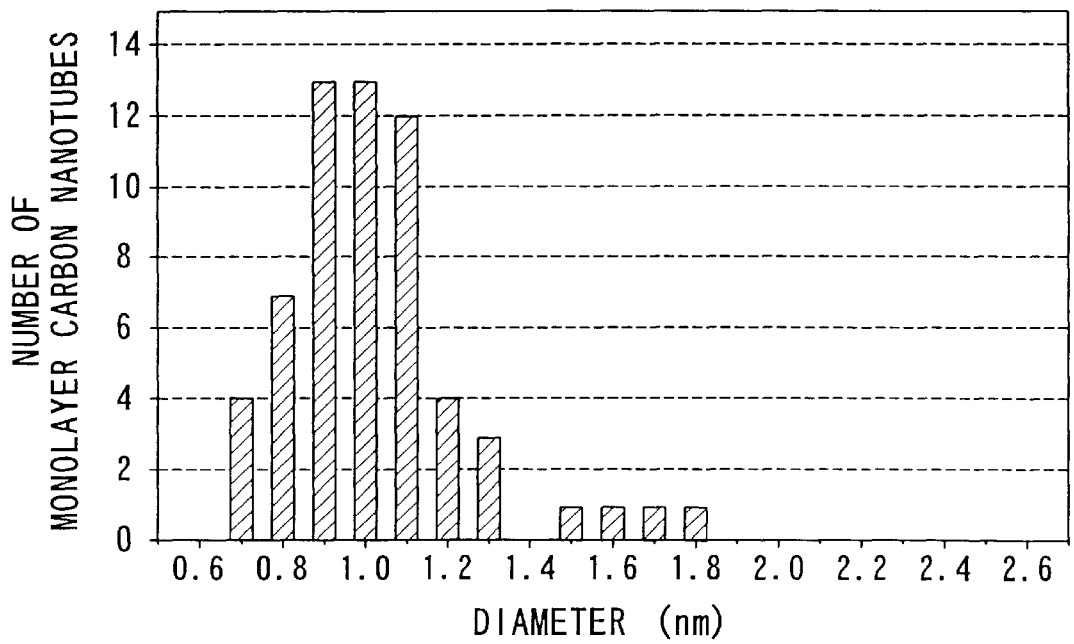
FIG. 4 is a graph indicating the diameter distribution of single-walled carbon nanotubes produced in Example 1 at a pressure of 50 Torr.

FIGS. 3 and 4 respectively illustrate the diameter distributions of single-walled carbon nanotubes obtained in the cases of 600 Torr and 50 Torr. As is clear from these graphs, by controlling the atmospheric pressure in the reactor chamber, it is possible to control the diameter and the diameter distribution of single-walled carbon nanotubes.

Figure 5:
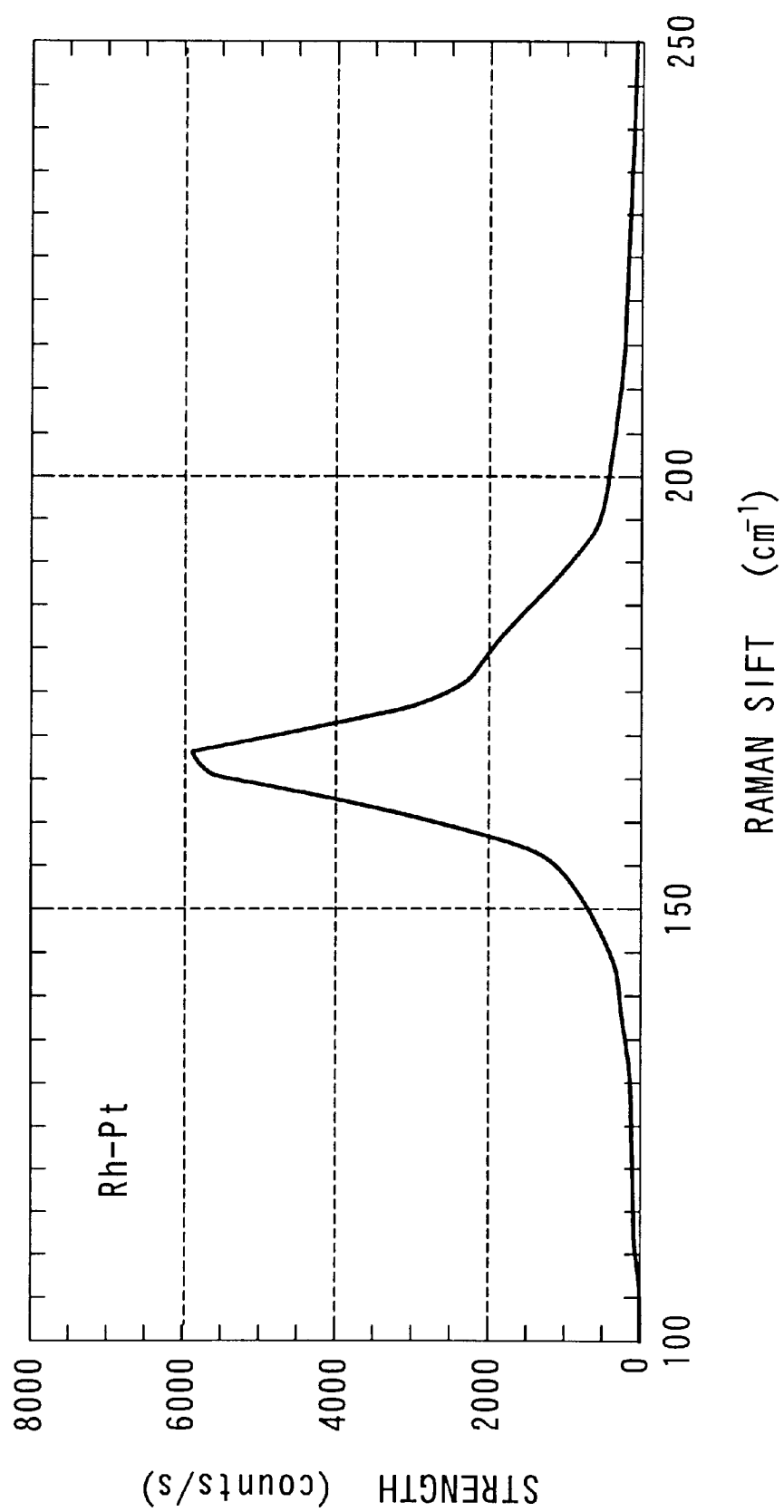
FIG. 5 is a graph indicating the Raman scattering spectrum of single-walled carbon nanotubes produced in Example 1 at a pressure of 600 Torr.

FIG. 5 shows the Raman spectrum indicating the diameter distribution of the single-walled carbon nanotubes produced in the case of 600 Torr. The main peak of 167 cm$^{-1}$ corresponds to a diameter of 1.33 nm, and the shoulder peak of 185 cm$^{-1}$ corresponds to a diameter of 1.21 nm. The measurement of the Raman spectrum was performed according to the method explained in J. Phys. Soc. Jpn., vol. 63, 1994, p.2252, and Science, vol. 275, 1997, p.187.

Examples 2–7

Single-walled carbon nanotubes were produced by the same method as that of the Example 1, except that the kind of non-magnetic transition metal was changed, that the weight ratio of the non-magnetic transition metal and graphite in the powder mixture was varied, and that the pressure in the reactor chamber was varied.

As the results, in all cases, straight single-walled carbon nanotubes could be obtained. The Table 1 also shows the yields (contents) of single-walled carbon nanotubes in the produced composite. The "yield in cathode soot" means the weight percentage of single-walled carbon nanotubes in all carbon contained in the cathode soot, and the "yield in chamber soot" means the weight percentage of single-walled carbon nanotubes in all carbon contained in the cathode soot. "Trace" means a trace amount which is less than 1 weight %.

As clearly shown in the Table 1, by controlling the reaction conditions such as the composition ratio in the powder mixture, it is possible to produce composites containing single-walled carbon nanotubes of 20–30 weight % of all carbon therein.

TABLE 1

| Example No. | Weight ratio in powder mixture | He pressure (Torr) | Yield in cathode soot | Yield in chamber soot |
|---|---|---|---|---|
| 2 | Ru:Pd:C 1:1:1 | 50 | — | — |
|  |  | 600 | 1% | — |
|  |  | 1520 | Trace | — |
| 3 | Rh:Pd:C 1:1:1 | 50 | Trace | — |
|  |  | 600 | 10% | — |
|  |  | 1520 | 1% | — |
| 4 | Ru:Rh:C 1:1:1 | 50 | 1% | — |
|  |  | 600 | 1% | Trace |
|  |  | 1520 | 1% | — |
| 5 | Ru:Pt:C 5:5:2 | 600 | 1% | Trace |
| 6 | Rh:Pt:C 9:1:2 | 600 | 20% | 1% |
|  | 1:1:1 | 600 | 30% | 10% |
|  | 1:9:2 | 600 | 20% | Trace |
| 7 | Pd:Pt:C 1:1:1 | 600 | 10% | Trace |

What is claimed is:

1. A method for producing carbon nanotubes comprising the steps of developing carbon nanotubes from particulates of a non-magnetic transition metal, which includes at least two elements selected from the group consisting of ruthenium, rhodium, palladium, and platinum and has an average grain size of the metal particles in a range from 10 to 20 nm by contacting carbon vapor with said non-magnetic transition metal in a reaction chamber containing inert gas at 50 to 1500 Torr.

2. The method for producing carbon nanotubes according to claim 1, wherein the non-magnetic transition metal is one selected from the group consisting of a binary mixture of ruthenium and rhodium, a binary mixture of ruthenium and palladium, a binary mixture of ruthenium and platinum, a binary mixture of rhodium and palladium, a binary mixture of rhodium and platinum, and a binary mixture of palladium and platinum.

3. The method for producing carbon nanotubes according to claim 1, wherein the non-magnetic transition metal is one selected from the group consisting of a binary mixture of rhodium and palladium, a binary mixture of rhodium and platinum, and a binary mixture of palladium and platinum.

4. A method for producing carbon nanotubes comprising the steps of:

generating carbon vapor and particulates of a non-magnetic transition metal including at least two elements selected from the group consisting of ruthenium, rhodium, palladium, and platinum in a reaction chamber containing inert gas at 50 to 1500 Torr, and developing carbon nanotubes by contacting said carbon vapor with said particulates of said non-magnetic transition metal having an average grain size of the metal particles in a range from 10 to 20 nm.

5. A method for producing carbon nanotubes according to claim 4, wherein the step of generating carbon vapor and particulates of a non-magnetic transition metal is performed using arc discharge in which a distance between an anode and a cathode is controlled.

6. A method for producing carbon nanotubes according to claim 4, wherein the step of generating carbon vapor and particulates of a non-magnetic transition metal is performed using arc discharge in which a distance between an anode and a cathode is controlled in the range of about 1 to about 2 mm.

7. The method for producing carbon nanotubes according to claim 5, wherein the non-magnetic transition metal is one selected from the group consisting of a binary mixture of ruthenium and rhodium, a binary mixture of ruthenium and palladium, a binary mixture of ruthenium and platinum, a binary mixture of rhodium and palladium, a binary mixture of rhodium and platinum, and a binary mixture of palladium and platinum.

8. The method for producing carbon nanotubes according to claim 5, wherein the arc discharge is performed in a reactor chamber containing inert gas at a pressure ranging from 50 to 1500 Torr.

9. The method for producing carbon nanotubes according to claim 5, wherein the arc discharge is performed using an electrode which contains carbon and a non-magnetic transition metal including at least two elements selected from the group consisting of ruthenium, rhodium, palladium, and platinum.

10. The method for producing carbon nanotubes according to claim 9, wherein the non-magnetic transition metal is one selected from the group consisting of a binary mixture of ruthenium and rhodium, a binary mixture of ruthenium and palladium, a binary mixture of ruthenium and platinum, a binary mixture of rhodium and palladium, a binary mixture of rhodium and platinum, and a binary mixture of palladium and platinum.

11. The method for producing carbon nanotubes according to claim 4, wherein the carbon vapor is contacted with the particulates of the non-magnetic transition metal in a reactor chamber containing inert gas at a pressure ranging from 50 to 1500 Torr.

12. The method for producing carbon nanotubes according to claim 11, wherein the non-magnetic transition metal is one selected from the group consisting of a binary mixture of ruthenium and rhodium, a binary mixture of ruthenium and palladium, a binary mixture of ruthenium and platinum, a binary mixture of rhodium and palladium, a binary mixture of rhodium and platinum, and a binary mixture of palladium and platinum.

13. The method for producing carbon nanotubes according to claim 11, wherein the non-magnetic transition metal is one selected from the group consisting of a binary mixture of rhodium and palladium, a binary mixture of rhodium and platinum, and a binary mixture of palladium and platinum.

14. The method for producing carbon nanotubes according to claim 4, wherein the carbon vapor is contacted with the particulates of the non-magnetic transition metal in a reactor chamber containing hydrogen gas and inert gas at a pressure ranging from 50 to 1500 Torr.

15. The method for producing carbon nanotubes according to claim 14, wherein the non-magnetic transition metal is one selected from the group consisting of a binary mixture of rhodium and palladium, a binary mixture of rhodium and platinum, and a binary mixture of palladium and platinum.

16. The method for producing carbon nanotubes according to claim 14, wherein the non-magnetic transition metal is one selected from the group consisting of a binary mixture of ruthenium and rhodium, a binary mixture of ruthenium and palladium, a binary mixture of ruthenium and platinum, a binary mixture of rhodium and palladium, a binary mixture of rhodium and platinum and a binary mixture of palladium and platinum.

17. The method for producing carbon nanotubes according to claim 4, wherein the non-magnetic transition metal is one selected from the group consisting of a binary mixture of rhodium and palladium, a binary mixture of rhodium and platinum, and a binary mixture of palladium and platinum.

18. The method for producing carbon nanotubes according to claim 4, wherein said non-magnetic transition metal is one selected from the group consisting of a binary mixture of ruthenium and rhodium, a binary mixture of ruthenium and palladium, a binary mixture of ruthenium and platinum, a binary mixture of rhodium and palladium, a binary mixture of rhodium and platinum, and a binary mixture of palladium and platinum, and the percentage content of one component in said binary mixture is less than 1% by weight.

19. The method for producing carbon nanotubes according to claim 7, wherein the arc discharge is performed in a reactor chamber containing inert gas at a pressure ranging from 50 to 1500 Torr.

20. A method for producing carbon nanotubes comprising the steps of: generating carbon vapor and particulates of a non-magnetic transition metal by arc discharge in a reaction chamber containing hydrogen gas and inert gas at a pressure ranging from 50 to 1500 Torr; and developing carbon nanotubes by contacting the carbon vapor with the particulates of the non-magnetic transition metal, wherein the non-magnetic transition metal is selected from the group consisting of a binary mixture of ruthenium and rhodium, a binary mixture of ruthenium and palladium, a binary mixture of ruthenium and platinum, a binary mixture of rhodium and palladium, a binary mixture of rhodium and platinum, and a binary mixture of palladium and platinum.

21. A method for producing carbon nanotubes comprising the steps of:

generating carbon vapor and particulates of a non-magnetic transition metal including at least two elements selected from the group consisting of ruthenium, rhodium, palladium, and platinum by arc discharge in a reaction chamber containing hydrogen gas and inert gas at a pressure ranging from 50 to 1500 Torr; and developing carbon nanotubes by contacting the carbon vapor with the particulates of the non-magnetic transition metal.

* * * * *